United States Patent [19]

Brümmer et al.

[11] Patent Number: 4,581,786
[45] Date of Patent: Apr. 15, 1986

[54] DUAL WINDSHIELD-WIPER ASSEMBLY

[75] Inventors: Dietmar Brümmer, Bühlertal; Jan Dietrich, Bühl; Dieter Wollenschläger; Rolf Zumbülte, both of Bühlertal, all of Fed. Rep. of Germany

[73] Assignee: Robert Bosch GmbH, Stuttgart, Fed. Rep. of Germany

[21] Appl. No.: 689,553

[22] Filed: Jan. 7, 1985

[30] Foreign Application Priority Data

Jan. 13, 1984 [DE] Fed. Rep. of Germany ....... 3401001

[51] Int. Cl.⁴ .......................... B60S 1/28; B60S 1/32; B60S 1/34
[52] U.S. Cl. ................. 15/250.35; 15/250.41; 15/250.42
[58] Field of Search ........... 15/250.27, 250.32, 250.35, 15/250.41, 250.42

[56] References Cited

U.S. PATENT DOCUMENTS

| 2,187,876 | 1/1940 | Ericson | 15/250.41 X |
| 2,799,887 | 7/1957 | Nemic | 15/250.35 |

FOREIGN PATENT DOCUMENTS

| 1240108 | 7/1960 | France | 15/250.41 |
| 2389518 | 1/1979 | France | 15/250.27 |
| 2437961 | 6/1980 | France | 15/250.41 |
| 2495078 | 6/1982 | France | 15/250.35 |

Primary Examiner—Peter Feldman
Attorney, Agent, or Firm—Michael J. Striker

[57] ABSTRACT

A windshield-wiper assembly has a single base normally pivotal about a base axis generally perpendicular to a windshield and a generally one-piece inner arm support pivotal on the base about an inner axis offset from and transverse to the base axis and generally parallel to the windshield. This inner arm support has an outer end extending radially generally away from both axes and a single spring is engaged offset from the inner axis between the inner arm support and base and urges the inner arm support rotationally in one direction on the base. A pair of similar outer arm bars extend radially of the inner axis from the outer end and have relative to the inner axis respective inner ends fixed in the one-piece inner arm support and outer ends offset generally parallel to the inner axis from each other. Respective wiper blades carried on the outer ends of the arm bars are pivotal thereon about outer axes generally parallel to the inner axis. Normally the spring urges the blades against the windshield.

11 Claims, 4 Drawing Figures

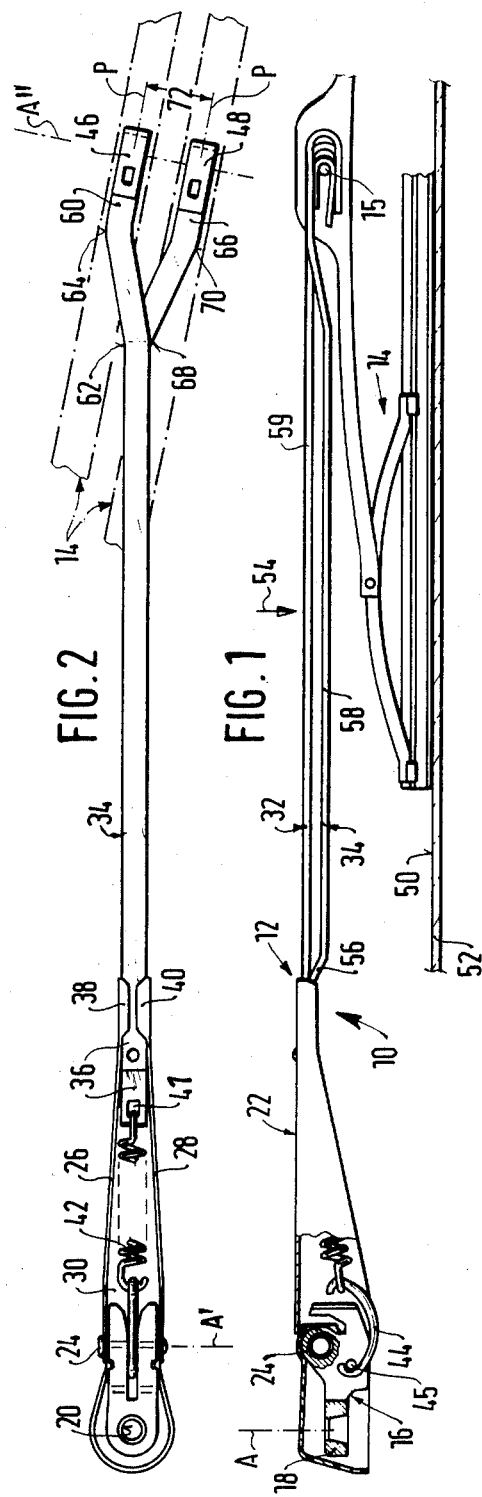
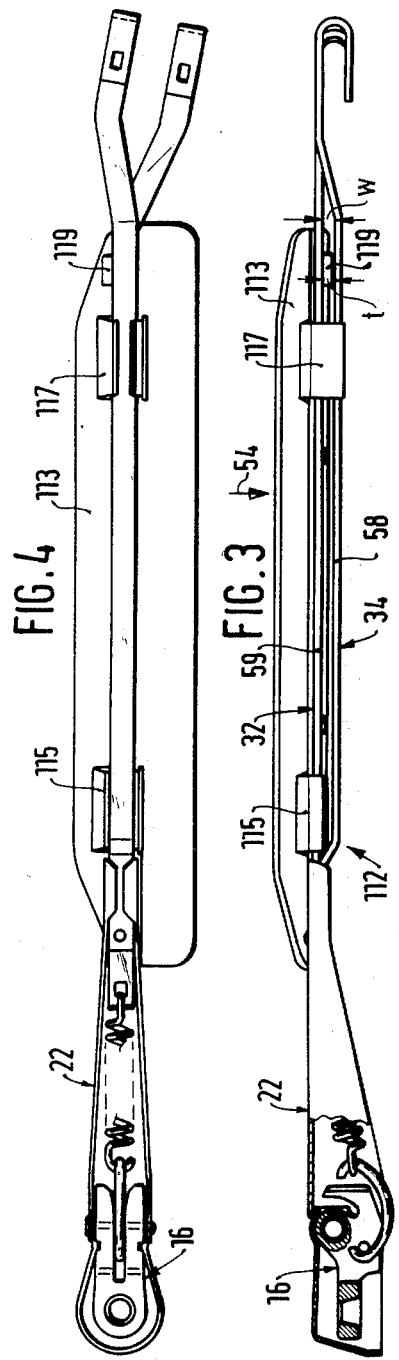

DUAL WINDSHIELD-WIPER ASSEMBLY

FIELD OF THE INVENTION

The present invention relates to a dual windshield-wiper assembly. More particularly this invention concerns such an assembly which has two separate and limitedly independently displaceable wiper blades.

BACKGROUND OF THE INVENTION

In heavy-duty and performance-car use it is known to carry on a single pivotal arm assembly a pair of generally identical wiper blades each comprising a flexible elastomeric strip, a metallic backing, and a pivot extending transversely of the strip and back. Thus the wiper motor shaft carries a base on which are pivoted two inner arm supports which carry respective arm bars having outer ends that carry the respective wiper blades. The motor oscillates the base about an axis generally perpendicular to the portion of windshield being wiped, and the two supports are pivotal on this base about an inner axis generally parallel to the windshield, offset from the base axis, and lying in a plane perpendicular to this base axis. Respective springs urge the supports rotationally on the base about the inner axis in a direction pressing the wipers against the windshield. The wipers are in turn pivotal on the outer arm-bar ends about outer axes generally parallel to the inner axis or axes.

The windshield is invariably curved so the two wipers must be able to move independently at least limitedly to follow the windshield. Thus the two supports are either placed next to each other on a common pivot pin on the base and have separate springs spaced apart parallel to the inner axis, and the two arm bars are spaced apart somewhat axially of the inner axis and extend generally parallel to each other and radially from the inner axis from the outer end of the support. It is also possible to interleave the two supports, which makes providing the respective springs fairly complex, and which normally leads to the two parts rubbing and interfering with each other.

The disadvantages of these arrangements is that they are relatively complex and bulky. They block the view past the wiper assembly, and often do not allow proper independent wiper action.

OBJECTS OF THE INVENTION

It is therefore an object of the present invention to provide an improved dual windshield-wiper assembly. Another object is the provision of such a dual windshield-wiper assembly which overcomes the above-given disadvantages, that is which functions effectively and which is of simple and inexpensive construction.

SUMMARY OF THE INVENTION

A windshield-wiper assembly according to the invention has a single base normally pivotal about a base axis generally perpendicular to a windshield and a generally one-piece inner arm support pivotal on the base about an inner axis offset from and transverse to the base axis and generally parallel to the windshield. This inner arm support has an outer end extending radially generally away from both axes and a single spring is engaged offset from the inner axis between the inner arm support and base and urges the inner arm support rotationally in one direction on the base. A pair of similar outer arm bars extend radially of the inner axis from the outer end and have relative to the inner axis respective inner ends fixed in the one-piece inner arm support and outer ends offset generally parallel to the inner axis from each other. Respective wiper blades carried on the outer ends of the arm bars are pivotal thereon about outer axes generally parallel to the inner axis. Normally the the spring urges the blades against the windshield.

Thus with this arrangement sufficient independent action of the wiper blades is possible while the overall construction of the wiper assembly is simplified greatly. In addition the assembly presents minimum blockage of view and can be relatively light so as to reduce the inertia of the unit.

According to this invention the two arm bars extend from the outer end of the inner arm support parallel to but spaced from each other and generally parallel to the windshield. They have center parts accounting for the major portion of their length and are spaced apart generally perpendicular to the windshield and parallel to the base axis. In addition they are flexible for movement of their outer ends angularly of their inner ends relative to the inner axis, being made of spring steel, for instance.

The outer ends of the arm bars according to the invention are formed as hooks spaced apart laterally parallel to the inner axis and the respective wipers are carried in the hooks. The outer end of at least one of the arm bars is bent laterally generally parallel to the windshield away from the outer end of the other arm bar and one of the arm bars is closer to the windshield than the other and its center part is offset by angled arm portions from its outer and inner ends. The inner ends of the arm bars are fixed to each other and to the outer end of the base.

The assembly according to this invention further has a deflector vane and clips that secure it on the arm bars. The deflector vane also includes a stop tab engageable between the arm bars and engageable therewith offset from the arm support. When the outer arm is bent in from substantial wind force during high-speed travel, this tab will prevent further bending and stiffen the entire assembly.

DESCRIPTION OF THE DRAWING

The above and other features and advantages will become more readily apparent from the following, it being understood that any feature described with reference to one embodiment of the invention can be used where possible with any other embodiment. In the accompanying drawing:

FIG. 1 is a side view partly in section of a wiper assembly according to the present invention;

FIG. 2 is a bottom view of the assembly of FIG. 1 with some parts removed for clarity of view; and FIGS. 3 and 4 are views like FIGS. 1 and 2 of a variation on the assembly in accordance with this invention.

SPECIFIC DESCRIPTION

As seen in FIGS. 1 and 2 a windshield-wiper assembly 10 according to the invention has an arm 12 pivotal about and extending generally radially from an axis A and a pair of wiper blades 14 which extend at an angle of 15°-20° to the arm 12 and lie in generally parallel respective planes P parallel to the axis A. One blade 14 is directly behind the other and not visible in FIG. 1 and the blades 14 are not illustrated in FIG. 2 so the arm 12 can be seen clearly.

The arm 12 has a base 16 formed with a hub 18 having a hole 20 that fits over a not illustrated shaft for oscillation of the assembly 10 about the axis A. A mainly U-section sheet-metal cover 22 has a pair of sides 26 and 28 bridged by a back 30 and is pivoted at an axis A' on a pin 24 passing through the cast-metal base 16 and engaged in the sides 26 and 28. The axis A' extends in a plane perpendicular to the axis A and is also perpendicular to the longitudinal direction of the arm 12 that here extends radially away from the axis A.

The arm 12 also has an outer part formed by a pair of stringy steel bars 32 and 34 having inner ends 36 engaged between the outer ends of the sides 26 and 28 and crimped under tabs 38 and 40 projecting toward each other from these sides 26 and 28. The inner end 36 of the upper bar 32 extends inward past the inner end 36 of the bar 34 and is formed with an eye 41 in which one end of a tension spring 42 is hooked. The other end of this spring 42 is hooked over a line 44 hooked in turn over an abutment pin 45 extending parallel to the pivot 24 and fixed in the base 16. Thus this spring 42 urges the arm 12 clockwise about the axis A', pressing the blades 14 in the direction 54 against the front or outer surface 50 of the windshield 52.

The upper bar 32 is straight, but the lower one 34 is bent at 56 to have a center part 58 that is parallel to but offset in the direction 54 from the center part 59 of the bar 32 so that the bar 32 perfectly overlies the bar 34 as seen from above or in front in FIG. 2. The bars 32 and 34 have respective outer ends 60 and 66 that are doglegged oppositely at 62, 64 and 68, 70 to have outer ends 46 and 48 that are parallel to each other and that form eyes for the pins 15 of the respective wiper blades 14. The end 60 lies all in the same plane as the bar 32, but the arm 66 is bent up and down respectively at the bends 68 and 70 so that only the outer eye end 48 is level with the end 46.

As a result the blades 14 will be independently and gently urged against the windshield, with some freedom of relative movement in and against the direction 54. Since the bars 32 and 34 overlie each other, they present minimal blockage to view through the windshield 52.

In FIGS. 3 and 4 the arrangement of FIGS. 1 and 2 is shown with a wind deflector 112. This arrangement basically comprises a flat normally clear-plastic deflector blade 113 secured by an inner clip 115 and an outer clip 117 on the bars 32 and 34. In the illustrated arrangement the clip 115 engages the inner region of the center part 59 of the bar 32 and the clip 117 engages the outer region of the center part 58 of the bar 34. The clips 115 and 117 could engage the opposite bars 34 and 32 or could both engage the one bar 32 or the other bar 34, depending on the aerodynamics of the particular vehicle having the wiper assembly 10.

The deflector vane 113 extends in a plane at an acute angle to the axes A and A' as well as to the planes P and has an outer end formed with a stiff tab 119 that projects between the outermost regions of the center parts 58 and 59. The thickness t of the tab 119 measured perpendicular to the confronting faces of the two center parts 58 and 59 is somewhat less than the width w also measured perpendicular between the two parts 58 and 59. Thus only at high speed when there is quite some deflection of the outer bar 32, thereby stiffening the entire assembly somewhat as is desirable under these circumstances, since the blade otherwise could be blown loose from the windshield surface 50.

We claim;

1. A windshield-wiper assembly comprising:
   a single base normally pivotal about a base axis generally perpendicular to a windshield;
   a generally one-piece inner arm support pivotal on the base about an inner axis offset from and transverse to the base axis and generally parallel to the windshield, the inner arm support having an outer end extending radially generally away from both axes;
   a spring engaged offset from the inner axis between the inner arm support and base and urging the inner arm support rotationally in one direction on the base;
   a pair of similar outer arm bars extending radially of the inner axis from the outer end and having relative to the inner axis respective inner ends fixed in the one-piece inner arm support and outer ends offset generally parallel to the inner axis from each other; and
   respective wiper blades carried on the outer ends of the arm bars and pivotal thereon about outer axes generally parallel to the inner axis, whereby normally the spring urges the blades against the windshield.

2. The windshield-wiper assembly defined in claim 1 wherein the two arm bars extend from the outer end of the inner arm support parallel to but spaced from each other and generally parallel to the windshield.

3. The windshield-wiper assembly defined in claim 2 wherein the arm bars have center parts accounting for the major part of their length and being spaced apart generally perpendicular to the windshield and parallel to the base axis.

4. The windshield-wiper assembly defined in claim 3 wherein the arm bars are flexible for movement of their outer ends angularly of their inner ends relative to the inner axis.

5. The windshield-wiper assembly defined in claim 3 wherein the outer ends of the arm bars are formed as hooks spaced apart laterally parallel to the inner axis, the respective wipers being carried in the hooks.

6. The windshield-wiper assembly defined in claim 5 wherein the outer end of at least one of the arm bars is bent laterally generally parallel to the windshield away from the outer end of the other arm bar.

7. The windshield-wiper assembly defined in claim 3 wherein one of the arm bars is closer to the windshield than the other and its center part is offset by angled arm portions from its outer and inner ends.

8. The windshield-wiper assembly defined in claim 3 wherein the inner ends of the arm bars are fixed to each other and to the outer end of the base.

9. The windshield-wiper assembly defined in claim 1 wherein the spring is a tension spring hooked offset from the inner axis between the base and inner arm support.

10. The windshield-wiper assembly defined in claim 1, further comprising:
    a deflector vane; and
    clip means for securing the vane on the arm bars.

11. The windshield-wiper assembly defined in claim 10, wherein the deflector vane includes a stop tab engageable between the arm bars and engageable therewith offset from the arm support.

* * * * *